United States Patent
Sano et al.

[11] Patent Number: 5,822,176
[45] Date of Patent: Oct. 13, 1998

[54] DIELECTRIC CERAMIC COMPOSITION AND MONOLITHIC CERAMIC CAPACITOR USING SAME

[75] Inventors: Harunobu Sano, Kyoto; Hiroyuki Wada, Shiga-ken; Yukio Hamaji, Otsu, all of Japan

[73] Assignee: Murata Manufacturing Co., Ltd., Kyoto, Japan

[21] Appl. No.: 879,536

[22] Filed: Jun. 20, 1997

[30] Foreign Application Priority Data

Jun. 20, 1996 [JP] Japan .................................. 8-160009

[51] Int. Cl.$^6$ .......................... H01G 4/06; H01G 4/228; H01G 4/20

[52] U.S. Cl. ................................. 361/321.4; 361/321.5; 361/306.3; 361/313; 361/309; 501/134; 501/137

[58] Field of Search ..................... 361/311, 313, 361/321.1, 321.2, 321.3, 321.4, 321.5, 322, 306.3, 309, 320; 501/134, 135, 136, 137, 138, 139

[56] References Cited

U.S. PATENT DOCUMENTS

| | | | |
|---|---|---|---|
| 4,574,329 | 3/1986 | Eijkelenkamp et al. | 361/321 |
| 4,610,971 | 9/1986 | Wada et al. | 501/137 |
| 4,985,381 | 1/1991 | Mori et al. | 501/136 |
| 5,036,424 | 7/1991 | Yokotani et al. | 361/321.4 |
| 5,117,326 | 5/1992 | Sano et al. | 361/321.4 |
| 5,659,456 | 8/1997 | Sano et al. | 361/321.4 |
| 5,734,545 | 3/1998 | Sano et al. | 361/321.4 |

FOREIGN PATENT DOCUMENTS 0690462 12/1996 European Pat. Off. .
4220681 1/1993 Germany .

OTHER PUBLICATIONS

Chem. abstr., vol. 110, No. 2, 09 Jan. 1989 (Columbus, OH, USA), p. 624, the abstract No. 17338d, N. Fujikawa, et al., "Non–reductive dielectric ceramic composition", JP 63–103861 A.
Patent Abstracts of Japan, vol. 015, No. 078, (E–1037), 22 Feb. 1991 & JP 02–296313, Dec. 6, 1990.
Patent Abstracts of Japan: vol. 096, No. 009, 30 Sep. 1996 & JP 08 124785 A (TDK Corp.), 17 May 1996.
Patent Abstracts of Japan: vol. 017, No. 325 (E–1384), 21 Jun. 1993 & JP 05 036566 A (TDK Corp.), 12 Feb. 1993.
Patent Abstracts of Japan: vol. 018, No. 355 (E–1573), 5 Jul. 1994 & JP 06 096983 A (Tokin Corp.), 8 Apr. 1994.

*Primary Examiner*—Kristine L. Kincaid
*Assistant Examiner*—Anthony Dinkins
*Attorney, Agent, or Firm*—Ostrolenk, Faber, Gerb & Soffen, LLP

[57] ABSTRACT

A dielectric ceramic composition and a monolithic ceramic capacitor using the composition are provided. The dielectric ceramic composition includes: barium titanate; at least one rare earth oxide selected from terbium oxide, dysprosium oxide, holmium oxide, erbium oxide and ytterbium oxide; manganese oxide and nickel oxide; and magnesium oxide in an amount of from 0.5 to 3.0 mols in terms of MgO, and silicon oxide in an amount of from 0.2 to 5.0 mols in terms of $SiO_2$, relative to 100 mols of the essential component having the following compositional formula:

$$(1-\alpha-\beta)\{BaO\}_m TiO_2 + \alpha Re_2O_3 + \beta(Mn_{1-x}Ni_x)O$$

where $Re_2O_3$ is at least one selected from $Tb_2O_3$, $Dy_2O_3$, $Ho_2O_3$, $Er_2O_3$ and $Yb_2O_3$; and α, β, m and x are as follows:
$0.0025 \leq \alpha \leq 0.020$
$0.0025 \leq \beta \leq 0.04$
$\beta/\alpha \leq 4$
$0 \leq x < 1.0$
$1.000 < m \leq 1.035$.

19 Claims, 2 Drawing Sheets

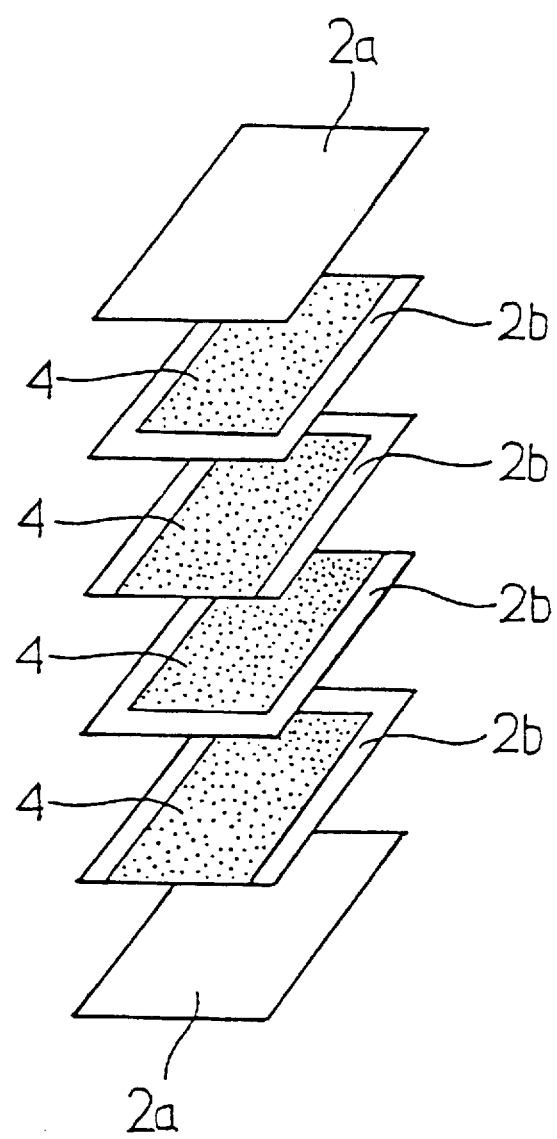

DIELECTRIC CERAMIC COMPOSITION AND MONOLITHIC CERAMIC CAPACITOR USING SAME

FIELD OF THE INVENTION

The present invention relates to a dielectric ceramic composition and monolithic ceramic capacitors using same to be used in electronic instruments, especially those having inner electrodes made of nickel or nickel alloys.

BACKGROUND OF THE INVENTION

Monolithic ceramic capacitors are generally produced as follows.

First, dielectric ceramic layer sheets coated with an electrode material intended to become an inner electrode are prepared. For example, the dielectric ceramic layers may consist essentially of $BaTiO_3$. Next, a plurality of such sheets of dielectric ceramic layers coated with the electrode material are laminated and integrated under heat and pressure, and the resulting laminate is baked at from 1250° C. to 1350° C. to obtain a monolithic dielectric ceramic body having inner electrodes therein. To the both ends of the dielectric ceramic body are fixed and baked outer electrodes that electrically communicate with the inner electrode. Thus is obtained a monolithic ceramic capacitor.

Accordingly, the materials for such inner electrodes must satisfy the following requirements.

1. Since the ceramic laminate and the inner electrodes are baked together, the melting point of the materials for the inner electrodes must be not lower than the temperature at which the ceramic laminate will be baked.

2. The materials for the inner electrodes must not be oxidized even in high-temperature, oxidizing atmospheres and must not react with the dielectric ceramic layers.

As electrodes that satisfy these requirements, noble metals, such as platinum, gold, palladium and silver-palladium alloys, have heretofore been used. However, these electrode materials are expensive, though having excellent characteristics. Accordingly, the cost of the electrode material reaches from 30 to 70% of the total cost of each monolithic ceramic capacitor. This is the essential factor of increasing the production costs of conventional monolithic ceramic capacitors.

Also known are base metals, such as Ni, Fe, Co, W and Mo, which have a high melting point. However, such base metals are easily oxidized in high-temperature, oxidizing atmospheres and lose the ability to function as electrodes. Therefore, if such base metals are used as the inner electrodes in monolithic ceramic capacitors, they must be baked in neutral or reducing atmospheres. However, conventional dielectric ceramic materials were defective in that if they are baked in such neutral or reducing atmospheres, they are greatly reduced into semiconductors.

In order to overcome these drawbacks, for example, proposed were a dielectric ceramic material comprising a solid solution of barium titanate where the ratio of barium sites/titanium sites is over the stoichiometric ratio thereof, such as that disclosed in Japanese Patent Publication No. 57-42588; and a dielectric ceramic material comprising a solid solution of barium titanate and containing oxides of rare earth metals, such as La, Nd, Sm, Dy and Y, added thereto, such as that disclosed in Japanese Patent Application Laid-Open No. 61-101459.

Also proposed were a dielectric ceramic material having a composition of $BaTiO_3$—$CaZrO_3$—$MnO$—$MgO$, such as that disclosed in Japanese Patent Application Laid-Open No. 62-256422; and a dielectric ceramic material having a composition of $BaTiO_3$—$(Mg,Zn,Sr,Ca)O$—$B_2O_3$—$SiO_2$, such as that disclosed in Japanese Patent Publication No. 61-14611.

Using these dielectric ceramic materials, ceramic laminates were obtained which are not converted into semiconductors even when baked in reducing atmospheres. As a result, it has become possible to produce monolithic ceramic capacitors comprising inner electrodes of base metals such as nickel.

With recent developments in electronics, small-sized electronic parts have become greatly required in the art, and small-sized, large-capacity, monolithic ceramic capacitors are therefore also greatly required therein.

For these reasons, the recent tendency in the art is rapidly toward dielectric ceramic materials having a higher dielectric constant and toward thinner dielectric ceramic layers. Accordingly, there is now a great demand for dielectric ceramic materials with high reliability having a high dielectric constant and whose temperature-dependent variation is small.

However, the dielectric ceramic materials disclosed in Japanese Patent Publication No. 57-42588 and Japanese Patent Application Laid-Open No. 61-101459 are defective in that the crystals constituting the ceramic laminates made from the materials are large, though the ceramic laminates themselves may have a high dielectric constant, with the result that if thin dielectric ceramic layers having a thickness of, for example, 10 $\mu$m or less are incorporated into monolithic ceramic capacitors, the number of ceramic crystals in one layer is reduced and therefore the reliability of the monolithic ceramic capacitors is lowered. In addition, the dielectric ceramic materials were further defective in that the temperature-dependent variation in the dielectric constant of the dielectric ceramics is great. For these reasons, the conventional dielectric ceramic materials could not meet the requirements in the market.

On the other hand, the dielectric ceramic material disclosed in Japanese Patent Application Laid-Open No. 62-256422 was defective in that $CaZrO_3$ and also $CaTiO_3$ that is formed during the baking step may often form secondary phases together with Mn and others and therefore the high-temperature reliability of the capacitor comprising the material is problematic, although the dielectric constant of the ceramic body of the material is relatively high, the crystals constituting the ceramic laminate are small, and the temperature-dependent variation in the dielectric constant is small.

The dielectric ceramic material disclosed in Japanese Patent Publication No. 61-14611 was defective in that the dielectric constant of the ceramic body of the material is from 2000 to 2800 and therefore the material is not suitable for small-sized, large-capacity monolithic ceramic capacitors. In addition, the material was further defective in that it does not satisfy the X7R-level characteristic standard of the EIA Standard, which requires that the temperature-dependent variation in capacitance within the range between −55° C. and +125° C. to be +/−15% or less.

Japanese Patent Publication No. 63-10386 discloses a non-reducing dielectric ceramic material, which, however, was defective in that its insulating resistance and the temperature-dependent variation in its capacity are greatly influenced by the grain size of the crystals of $BaTiO_3$, which is the essential component constituting the material, and therefore the material is difficult to control so as to obtain stable characteristics. In addition, for the insulating resistance of the material, the product of the insulating resistance value and the capacitance value (product CR) falls between 1000 and 2000 (WF). In view of this, the material could not be practicable.

Although some improvements were made in the non-reducing dielectric ceramic compositions that have heretofore been proposed in the art, such as those mentioned hereinabove, to make them have good insulation resistance in high-temperature load life tests, the improvement in their insulation resistance in moisture-resistant load tests was still unsatisfactory as yet.

In order to solve the above-mentioned problems, proposed were different compositions, for example, in Japanese Patent Application Laid-Open Nos. 05-09066, 05-09067 and 05-09068. However, these compositions could still not satisfy the recent severe requirements for small-sized, large-capacity capacitors in the market. Specifically, the recent requirements for these in the market are to make them have much thinner dielectric ceramic layers and high reliability. Therefore, there is still a great demand for dielectric ceramic materials capable of producing much thinner dielectric ceramic layers in monolithic ceramic capacitors with much higher reliability. Given the situation, accordingly, it has become necessary to provide small-sized, large-capacity, high-reliability monolithic ceramic capacitors which still have highly-reliable characteristics even in high-temperature and high-humidity conditions.

SUMMARY OF THE INVENTION

Accordingly, the subject matter of the present invention is to provide a low-priced, small-sized, large-capacity, monolithic ceramic capacitor, which has a dielectric constant of 3000 or more, which has a high insulation resistance, when measured at room temperature and 125° C., of 6000 MΩ·μF or more and 2000 MΩ·μF or more, respectively, in terms of its product with the capacitance (the product CR), which has temperature-dependent capacitance that satisfies the B-level characteristic standard of the JIS Standard and the X7R-level characteristic standard of the EIA Standard, and which has good weather resistance even in high-temperature and high-humidity load conditions.

The present invention has been made in consideration of the above-mentioned object.

Specifically, the present invention provides a monolithic ceramic capacitor composed of a plurality of dielectric ceramic layers, a plurality of inner electrodes formed between the dielectric ceramic layers in such a manner that one end of each inner electrode is exposed at an end of the dielectric ceramic layers, and outer electrodes electrically connected with the exposed inner electrodes, which is characterized in that the dielectric ceramic layers are made of a material comprising barium titanate having a content of alkali metal oxides impurities of about 0.02% by weight or less; at least one rare earth oxide selected from terbium oxide, dysprosium oxide, holmium oxide, erbium oxide and ytterbium oxide; and manganese oxide and nickel oxide; and containing side components, magnesium oxide in an amount of from about 0.5 to 3.0 mols in terms of MgO, and silicon oxide in an amount of from about 0.2 to 5.0 mols in terms of $SiO_2$, relative to 100 mols of the essential component having the following compositional formula:

$$(1-\alpha-\beta)\{BaO\}_m TiO_2 + \alpha Re_2O_3 + \beta(Mn_{1-x}Ni_x)O$$

where $Re_2O_3$ is at least one selected from $Tb_2O_3$, $Dy_2O_3$, $Ho_2O_3$, $Er_2O_3$ and $Yb_2O_3$; and α, β, m and x are as follows:
$0.0025 \leq \alpha \leq 0.020$
$0.0025 \leq \beta \leq 0.04$
$\beta/\alpha \leq 4$
$0 \leq x < 1.0$
$1.000 < m \leq 1.035$; and the inner electrodes each are made of nickel or a nickel alloy.

Preferably, the content of alkali metal oxides impurities is about 0.012% by weight or less; the magnesium oxide is about 1 to 2 mols in terms of MgO, and silicon oxide is about 1 to 2.5 mols in terms of $SiO_2$, relative to 100 mols of the essential component; $0.0075 \leq \alpha \leq 0.020$; $0.0075 \leq \beta \leq 0.024$; $\beta/\alpha \leq 2$; $0.1 \leq x < 0.8$; and $1.005 \leq m \leq 1.015$.

Preferably, the outer electrodes in the monolithic ceramic capacitor of the present invention are made of a sintered layer of an electroconductive metal powder or of an electroconductive metal powder with glass frit added thereto. Further preferably, the outer electrodes are composed of a first, sintered layer of an electroconductive metal powder or of an electroconductive metal powder with glass frit added thereto, and a second, plated layer formed on the first layer.

BRIEF DESCRIPTION OF THE DRAWINGS

FIG. 3 is a perspective, exploded view of one embodiment of a ceramic laminate as prepared in the present invention.

DETAILED DESCRIPTION OF THE INVENTION

Figure 1:
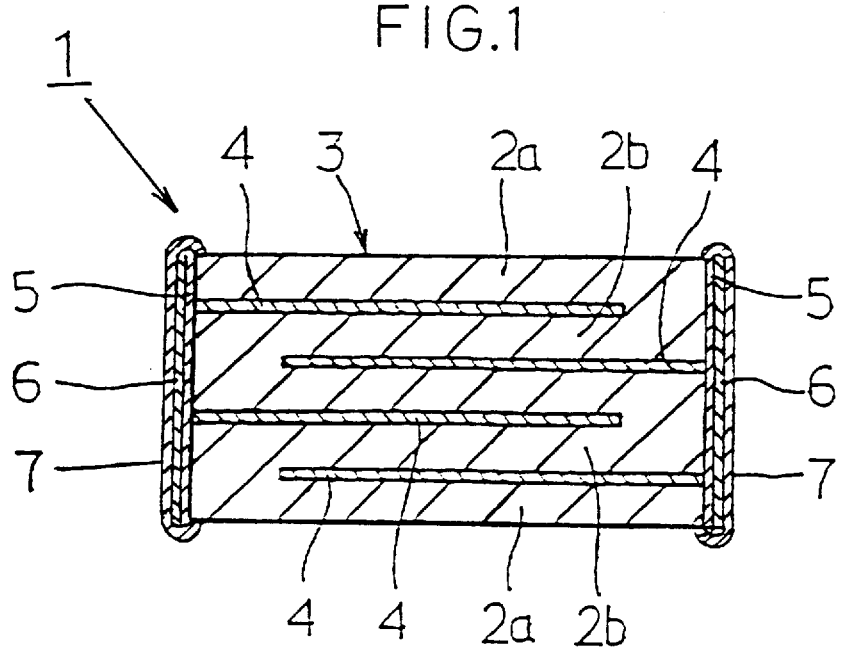
FIG. 1 is a cross-sectional view of one embodiment of the monolithic ceramic capacitor of the present invention.

Now, preferred modes of carrying out the invention are described in detail hereinunder.

As the material for the dielectric ceramic layers constituting the monolithic ceramic capacitor of the present invention, herein used is a dielectric ceramic material comprising barium titanate, terbium oxide, dysprosium oxide, holmium oxide, erbium oxide, ytterbium oxide, manganese oxide and nickel oxide, in the specifically compositional ratio mentioned hereinabove, and containing magnesium oxide and silicon oxide within the range defined hereinabove. Therefore, even in a reducing atmosphere, the dielectric ceramic material can be baked well without worsening its characteristics. As a result, it is possible according to the present invention to obtain a high-reliability, monolithic ceramic capacitor having a temperature-dependent capacitance that satisfies the B-level characteristic standard of the JIS Standard and also the X7R-level characteristic standard of the EIA Standard, and having high insulation resistance at room temperature and even at high temperatures.

It has been confirmed that of the essential components constituting the dielectric ceramic material for use in the present invention, such as barium titanate, terbium oxide, dysprosium oxide, holmium oxide, erbium oxide, ytterbium oxide, manganese oxide and nickel oxide, the content of the impurities in the barium titanate, such as alkaline earth metal oxides, e.g., SrO and CaO; alkali metal oxides, e.g., $Na_2O$ and $K_2O$; and other oxides, e.g., $Al_2O_3$ and $SiO_2$, especially that of alkali metal oxides such as $Na_2O$ and $K_2O$, has a great influence on the electric characteristics of the capacitor of the invention. Specifically, it has been confirmed that if barium titanate having an alkali metal oxide impurity content of smaller than about 0.02% by weight is in the dielectric ceramic material, the capacitor of the invention comprising the dielectric ceramic can have a dielectric constant of 3000 or higher.

The reason why silicon oxide is added to the dielectric ceramic layers in the present invention is that said addition improves the sinterability of the layers if the sintering atmosphere is controlled to have an oxygen partial pressure near to the equilibrated oxygen partial pressure of Ni/NiO at relatively high temperatures during the sintering step, while also improving the moisture-resistant load characteristics of the capacitors comprising the layers.

If the dielectric ceramic material mentioned hereinabove is used to form the dielectric ceramic layers constituting the monolithic ceramic capacitor of the invention, it is possible to use base metals, nickel or nickel alloys, to form the inner electrodes of the capacitor. In addition, it is also possible to add a small amount of ceramic powder to the inner electrodes along with nickel or nickel alloys.

The composition of the outer electrodes of the capacitor of the invention is not specifically defined. Concretely, for example, the outer electrodes may be made of sintered layers of various electroconductive metal powders, such as Ag, Pd, Ag—Pd, Cu or Cu alloys, or sintered layers comprising such electroconductive metal powders and various types of glass frit of $B_2O_3$—$Li_2O$—$SiO_2$—BaO, $B_2O_3$—$SiO_2$—BaO, $Li_2O$—$SiO_2$—BaO, $B_2O_3$—$SiO_2$—ZnO or the like. If desired, a small amount of ceramic powder may be added to the sintered layers comprising such electroconductive metal powders and optionally glass frit. More preferably, the sintered layers are coated with a plate layer. The plate layer may comprise Ni, Cu, Ni—Cu alloys or the like, and may be further coated with an additional plate layer of solder, tin or the like.

Now, the present invention is described in more detail with reference to the following Examples, which, however, are not intended to restrict the scope of the invention.

Figure 2:
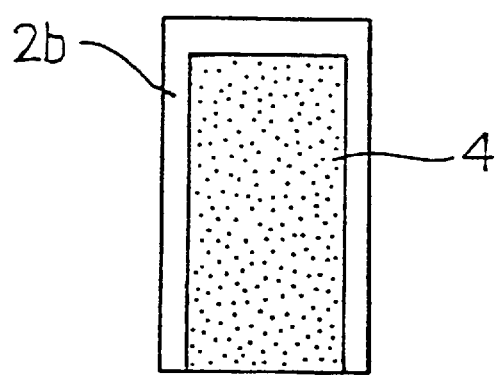
FIG. 2 is a plan view of one embodiment of a dielectric ceramic layer having an inner electrode thereon, which is prepared in the present invention.

One embodiment of the monolithic ceramic capacitor of the present invention is shown in FIG. 1 which is a cross-sectional view of the monolithic ceramic capacitor of the invention. FIG. 2 is a plan view illustrating the outline of the dielectric ceramic layer having an inner electrode thereon, which is in this embodiment. FIG. 3 is a perspective, exploded view illustrating the ceramic laminate of this embodiment.

In FIG. 1, the monolithic ceramic capacitor 1 of the present invention is in the form of a rectangular parallelepiped chip, in which the outer electrodes 5 have first plate layers 6 made of nickel, copper or the like, and second plate layers 7 made of solder, tin or the like are formed on the both sides of the ceramic laminate 3, as formed through lamination of a plurality of dielectric ceramic layers 2a and 2b with the inner electrode 4 therebetween.

Now, a method for producing the monolithic ceramic capacitor 1 of the invention is described below in the order of the steps constituting the method.

First, the ceramic laminate 3 is formed. This ceramic laminate 3 is produced as follows. As in FIG. 2, a raw material powder comprising barium titanate; at least one or more rare earth oxides selected from terbium oxide, dysprosium oxide, holmium oxide, erbium oxide and ytterbium oxide; manganese oxide, nickel oxide, magnesium oxide; and oxides consisting essentially of silicon oxide is formed into a slurry, and then sheeted to prepare a dielectric ceramic layer 2b (green sheet). On one surface of the green sheet, formed is an internal electrode 4 of nickel or a nickel alloy. To form the internal electrode 4, employable is any method of screen printing, metal vapor deposition or plating.

A predetermined number of the dielectric ceramic layers 2b, each with the inner electrode 4 formed thereon, are laminated, and then sandwiched between two dielectric ceramic layers 2a which have no inner electrode, as in FIG. 3, and these are integrated under pressure to give a laminate. Next, the resulting laminate composed of the dielectric ceramic layers 2a, 2b, . . . 2b, 2a is baked in a reducing atmosphere at a predetermined temperature to obtain the ceramic laminate 3.

Next, on the both sides of the ceramic laminate 3, formed are two outer electrodes 5 that are connected with the inner electrodes 4. The material of the outer electrodes 5 may be the same as that of the inner electrodes 4. Apart from this, silver, palladium, silver-palladium alloys, copper, copper alloys and others can be used as the material of the outer electrodes 5, to which can be added glass frit, such as glass of the type of $B_2O_3$—$SiO_2$—BaO or $Li_2O$—$SiO_2$—BaO. In consideration of the use of the monolithic ceramic capacitor of the invention and the site at which the capacitor is used, suitable materials are selected for the outer electrodes 5. The outer electrodes 5 can be formed by applying a paste material of metal powder onto the baked ceramic laminate 3 followed by baking it. Alternatively, the paste material can be applied onto the non-baked ceramic laminate 3, and baked all components at a time. After this, the outer electrodes 5 may be plated with nickel, copper or the like to form a first plate layer 6 thereon. Last, the first plate layer 6 is coated with a second plate layer 7 of solder, tin or the like. Thus is produced the chip-type, monolithic ceramic capacitor 1 of the invention.

The following Example is to further illustrate the invention in more detail.

EXAMPLE 1

First, raw materials of $TiCl_4$ and $Ba(NO_3)_2$ having various degrees of purity were prepared and weighed. These were treated with oxalic acid to obtain a precipitate of barium titanyl oxalate ($BaTiO(C_2O_4)\cdot 4H_2O$). This precipitate was decomposed under heat at 1000° C. or higher to obtain four types of barium titanate ($BaTiO_3$) as shown in Table 1.

Next, prepared were $Tb_2O_3$, $Dy_2O_3$, $Ho_2O_3$, $Er_2O_3$, $Yb_2O_3$, MnO, NiO and MgO each having a purity of 99% or more, and a colloidal silica containing silicon dioxide in an amount of 20% by weight in terms of $SiO_2$.

TABLE 1

| Type of BaTiO₃ | Content of Impurities (wt. %) | | | | | Mean Grain Size |
| | Alkali Metal Oxides | SrO | CaO | SiO₂ | Al₂O₃ | (μm) |
| --- | --- | --- | --- | --- | --- | --- |
| A | 0.003 | 0.012 | 0.001 | 0.010 | 0.005 | 0.60 |

TABLE 1-continued

| Type of BaTiO$_3$ | Content of Impurities (wt. %) | | | | | Mean Grain Size ($\mu$m) |
| --- | --- | --- | --- | --- | --- | --- |
| | Alkali Metal Oxides | SrO | CaO | SiO$_2$ | Al$_2$O$_3$ | |
| B | 0.020 | 0.010 | 0.003 | 0.019 | 0.008 | 0.56 |
| C | 0.012 | 0.179 | 0.018 | 0.155 | 0.071 | 0.72 |
| D | 0.062 | 0.014 | 0.001 | 0.019 | 0.004 | 0.58 |

Next, these raw materials were mixed in various compositional ratios as shown in Table 2 and Table 3 to prepare various compositions. Each composition was wet-milled in a ball mill, evaporated to dryness and to obtain a powdery raw material mixture.

The resulting mixture was wet-milled in a ball mill along with a polyvinyl butyral binder and an organic solvent such as ethanol to obtain a ceramic slurry. This ceramic slurry was sheeted according to doctor blading to obtain a rectangular green sheet having a thickness of 11 $\mu$m. Next, an electroconductive paste consisting essentially of Ni was printed on this ceramic green sheet to form thereon an electroconductive paste layer, which is formed into an inner electrode.

A plurality of these ceramic green sheets each having the electroconductive paste layer formed thereon were laminated in such a manner that the side of one sheet with the electroconductive paste exposed out of it was alternated with the side of another sheet with the electroconductive paste not exposed out of it. Thus was obtained a laminate. This laminate was heated in an $N_2$ atmosphere at 350° C. whereby the binder was burnt out, and then baked for 2 hours in a reducing atmosphere comprising gases of $H_2$, $N_2$ and $H_2O$ and having an oxygen partial pressure of from $10^{-11}$ to $10^{-8}$ MPa, at various temperatures shown in Table 4, to obtain sintered ceramic bodies.

The surface of each sintered ceramic body was observed with a scanning electronic microscope at a magnification of

TABLE 2

$(1 - \alpha - \beta)(BaO)m.TiO_2 + \alpha Re_2O_3 + \beta(Mn_{1-x}Ni_x)O$

| Sample No. | Type of BaTiO$_3$ | $\alpha$ | | | | | | $\beta$ | x | $\beta/\alpha$ | m | MgO (mol) | SiO$_2$ (mol) |
| --- | --- | --- | --- | --- | --- | --- | --- | --- | --- | --- | --- | --- | --- |
| | | Tb$_2$O$_3$ | Dy$_2$O$_3$ | Ho$_2$O$_3$ | Er$_2$O$_3$ | Yb$_2$O$_3$ | Total | | | | | | |
| *1 | A | — | — | — | — | — | 0.0000 | 0.005 | 0.3 | — | 1.010 | 1.20 | 1.00 |
| *2 | A | | 0.008 | | 0.002 | | 0.0100 | 0.000 | — | 0 | 1.010 | 1.20 | 1.00 |
| *3 | A | | 0.008 | | 0.002 | | 0.0100 | 0.005 | 0.3 | 1/2 | 0.990 | 1.20 | 1.00 |
| *4 | A | | | 0.0100 | | | 0.0100 | 0.005 | 0.3 | 1/2 | 1.000 | 1.00 | 1.00 |
| *5 | A | | 0.0020 | 0.0080 | | | 0.0100 | 0.0100 | 0.3 | 1 | 1.010 | 0.00 | 1.00 |
| *6 | A | | 0.008 | | | | 0.0080 | 0.0080 | 0.3 | 1 | 1.015 | 1.20 | 0.00 |
| *7 | A | | | 0.0075 | | | 0.0075 | 0.0075 | 0.5 | 1 | 1.015 | 1.50 | 0.10 |
| 8 | A | 0.0015 | 0.0010 | | | | 0.0025 | 0.0025 | 0.1 | 1 | 1.005 | 0.50 | 0.20 |
| 9 | A | | 0.0075 | | | 0.0025 | 0.0100 | 0.0080 | 0.5 | 4/5 | 1.010 | 1.00 | 1.00 |
| 10 | A | | 0.0060 | | | 0.0060 | 0.0120 | 0.0080 | 0.0 | 2/3 | 1.010 | 1.50 | 1.50 |
| 11 | A | 0.0030 | | | 0.0060 | | 0.0090 | 0.0090 | 0.4 | 1 | 1.015 | 1.20 | 1.50 |
| 12 | A | 0.0040 | | 0.0040 | | | 0.0080 | 0.0080 | 0.3 | 1 | 1.010 | 1.20 | 1.00 |
| 13 | C | | 0.010 | | 0.0100 | | 0.0200 | 0.0400 | 0.8 | 2 | 1.005 | 1.00 | 2.00 |
| 14 | B | 0.0030 | | | | | 0.0030 | 0.0060 | 0.4 | 2 | 1.010 | 3.00 | 5.00 |
| 15 | A | | | | 0.008 | 0.002 | 0.0100 | 0.0050 | 0.0 | 1/2 | 1.010 | 1.00 | 1.50 |
| 16 | A | | | 0.0060 | | | 0.0060 | 0.0240 | 0.6 | 4 | 1.035 | 0.50 | 2.50 |
| 17 | A | | 0.0080 | | | 0.012 | 0.0200 | 0.0050 | 0.1 | 1/4 | 1.015 | 2.00 | 1.50 |

TABLE 3

$(1 - \alpha - \beta)(BaO)m.TiO_2 + \alpha Re_2O_3 + \beta(Mn_{1-x}Ni_x)O$

| Sample No. | Type of BaTiO$_3$ | $\alpha$ | | | | | | $\beta$ | x | $\beta/\alpha$ | m | MgO (mol) | SiO$_2$ (mol) |
| --- | --- | --- | --- | --- | --- | --- | --- | --- | --- | --- | --- | --- | --- |
| | | Tb$_2$O$_3$ | Dy$_2$O$_3$ | Ho$_2$O$_3$ | Er$_2$O$_3$ | Yb$_2$O$_3$ | Total | | | | | | |
| *18 | A | | | 0.020 | | 0.010 | 0.030 | 0.015 | 0.3 | 1/2 | 1.010 | 2.00 | 1.50 |
| *19 | A | | 0.010 | | 0.005 | | 0.015 | 0.060 | 0.3 | 4.0 | 1.010 | 1.20 | 1.50 |
| *20 | A | | 0.010 | | | | 0.010 | 0.010 | 1.0 | 1.0 | 1.010 | 1.20 | 1.00 |
| *21 | A | 0.0050 | | | | | 0.0050 | 0.040 | 0.3 | 8.0 | 1.010 | 1.20 | 1.00 |
| *22 | A | | 0.010 | | | | 0.010 | 0.0050 | 0.3 | 1/2 | 1.050 | 1.20 | 2.00 |
| *23 | A | | 0.010 | | | | 0.010 | 0.0050 | 0.3 | 1/2 | 1.010 | 5.0 | 2.00 |
| *24 | A | | 0.010 | | | | 0.010 | 0.0050 | 0.3 | 1/2 | 1.010 | 1.20 | 8.00 |
| *25 | D | | 0.010 | | | | 0.010 | 0.0050 | 0.3 | 1/2 | 1.010 | 1.20 | 1.50 |

1500 times to determine the grain sizes of the grains seen in the field of view.

A silver paste containing glass frit of the type of $B_2O_3$—$Li_2O$—$SiO_2$—$BaO$ was applied onto the both sides of each sintered ceramic body, and it was baked again in an $N_2$ atmosphere at 600° C. to thereby form outer electrodes electrically connected with the inner electrodes.

The outer dimension of each of these monolithic capacitors thus obtained was 1.6 mm width×3.2 mm length×1.2 mm thickness, and the thickness of each dielectric ceramic layer as sandwiched between the inner electrodes was 8 μm.

The total number of the effective dielectric ceramic layers was 19, and the area of the facing electrodes per one ceramic layer was 2.1 mm².

The capacitance (C) and the dielectric loss (tan δ) of each sample were measured using an automatic bridge-type meter at a frequency of 1 KHz, at 1 V rms and at 25° C. From the capacitance thus measured, obtained was the dielectric constant (ε) through calculation. Next, to measure the insulation resistance (R) of each sample, a direct current voltage of 16 V was applied to each sample at 25° C. or 125° C. for 2 minutes, using an insulation resistance meter. After having thus measured the insulation resistance (R) of each sample, the product of the capacitance (C) and the insulation resistance (R) or, that is, the product CR of each sample was obtained. In addition, the temperature-dependent variation in the capacitance of each sample was determined.

For the temperature-dependent variation in the capacitance, obtained were the variation in the capacitance between −25° C. and 85° C. based on the capacitance at 20° C. ($\Delta C/C_{20°\ C.}$) the variation in the capacitance between −55° C. and 125° C. based on the capacitance at 25° C. ($\Delta C/C_{25°\ C.}$), and the maximum variation, in terms of the absolute value, between −55° C. and 125° C. (/ΔC/max).

To determine the high-temperature load life of each sample, 36 pieces of each sample were subjected to a high-temperature load test in which a direct current voltage of 100 V was applied to each piece at 150° C. while measuring the insulation resistance of each test piece which varied time-dependently. In this test, the period of time within which the insulation resistance value (R) of each piece being tested reached $10^6$ W or lower was measured, which is referred to as the life time of each test piece. The average of all the tested pieces was calculated to obtain the average life time of each sample.

In addition, to measure the moisture-resistant load life of each sample, 72 pieces of each sample were subjected to a high-humidity load test in which a direct current voltage of 16 V was applied to each piece at 121° C. under 2 atmospheres (relative humidity: 100%), while measuring the insulation resistance of each test piece which varied time-dependently. In this test, the number of the test pieces that had an insulation resistance value (R) of $10^6$ W or lower within a period of 250 hours was counted. The results obtained in these tests are shown in Table 4.

TABLE 4

| Sample No. | Baking Temp. (°C.) | Dielectric Constant, ε | Dielectric Loss, tanδ(%) | Temperature-Dependent Variation in Capacitance, ΔC/C20° C.(%) | | Temperature-Dependent Variation in Capacitance, ΔC/C25° C.(%) | | | Product of CR (Ω · F), at 25° C. 16V | Product of CR (Ω · F), at 125° C. 16V | Mean Life Time (hr.) | Number of Test Pieces Failed in Moisture-Resistant Load Test | Grain Size (μm) |
|---|---|---|---|---|---|---|---|---|---|---|---|---|---|
| | | | | −25° C. | 85° C. | −55° C. | 125° C. | max | | | | | |
| *1 | 1300 | 3090 | 2.3 | −12.1 | −4.5 | −16.3 | 2.2 | 16.3 | 8200 | 1880 | 7 | 0/72 | 0.77 |
| *2 | 1280 | | | As semiconductors were formed, the measurement was impossible. | | | | | | | | | 2.4 |
| *3 | 1280 | | | As semiconductors were formed, the measurement was impossible. | | | | | | | | | 2.1 |
| *4 | 1280 | 3420 | 2.3 | −3.3 | −6.2 | −3.4 | −6.5 | 6.5 | 2360 | 570 | 158 | 0/72 | 0.75 |
| *5 | 1280 | 3390 | 2.0 | 0.1 | −10.5 | 0.7 | −16.3 | 16.3 | 4700 | 1510 | 302 | 0/72 | 0.74 |
| *6 | 1360 | | | As the sample was sintered insufficiently, the measurement was impossible. | | | | | | | | | 0.61 |
| *7 | 1330 | 3250 | 2.0 | −3.2 | −5.5 | −3.2 | −5.9 | 5.9 | 4400 | 1820 | 310 | 51/72 | 0.68 |
| 8 | 1300 | 4110 | 2.5 | −7.1 | −7.4 | −11.9 | −13.8 | 13.8 | 7700 | 4630 | 325 | 0/72 | 0.72 |
| 9 | 1280 | 3320 | 1.9 | −2.4 | −5.5 | −2.5 | −6.7 | 6.7 | 5980 | 2320 | 503 | 0/72 | 0.68 |
| 10 | 1300 | 3120 | 1.8 | −3.0 | −4.3 | −3.2 | −4.7 | 4.8 | 6100 | 2230 | 548 | 0/72 | 0.69 |
| 11 | 1280 | 3490 | 2.0 | −1.2 | −7.2 | −0.3 | −10.2 | 105 | 6550 | 2480 | 526 | 0/72 | 0.71 |
| 12 | 1280 | 3570 | 2.1 | −1.5 | −7.6 | −1.0 | −9.4 | 11.8 | 6660 | 2850 | 518 | 0/72 | 0.72 |
| 13 | 1300 | 3050 | 1.5 | −1.9 | −4.8 | −1.8 | −5.4 | 5.5 | 6060 | 2040 | 601 | 0/72 | 0.78 |
| 14 | 1260 | 3430 | 1.9 | −3.7 | −7.0 | −4.4 | −10.9 | 11.0 | 7380 | 3970 | 356 | 0/72 | 0.64 |
| 15 | 1280 | 3330 | 2.0 | −0.8 | −6.1 | −1.4 | −6.2 | 6.2 | 6090 | 2120 | 388 | 0/72 | 0.69 |
| 16 | 1300 | 3380 | 1.8 | −0.4 | −9.0 | −2.0 | −12.3 | 12.3 | 6870 | 2450 | 311 | 0/72 | 0.68 |
| 17 | 1300 | 3010 | 1.5 | −1.6 | −3.5 | −2.2 | −2.7 | 3.8 | 6060 | 2040 | 632 | 0/72 | 0.68 |
| *18 | 1360 | 2310 | 1.3 | −2.2 | −2.3 | −3.5 | −2.4 | 3.6 | 3840 | 1010 | 213 | 7/72 | 0.65 |
| *19 | 1280 | 3070 | 1.8 | −0.2 | −9.6 | −0.2 | −15.9 | 15.9 | 5630 | 510 | 112 | 0/72 | 0.70 |

As is obvious from Table 1, Table 2, Table 3 and Table 4, the monolithic ceramic capacitor samples falling within the scope of the present invention all were found to have a high dielectric constant ε of not lower than 3,000, and have a dielectric loss tangent, tan δ, of not larger than 2.5%, while satisfying the B-level characteristic standard as stipulated in the JIS Standard within the temperature range between −25° C. and 85° C. and also the X7R-level characteristic standard stipulated in the EIA Standard within the temperature range between −55° C. and 125° C. with respect to the temperature-dependent variation in the capacitance.

Moreover, these samples of the invention were found to have high insulation resistance values, when measured at 25° C. and 125° C., of not smaller than 6,000 MΩ·μF and not smaller than 2,000 MΩ·μF, respectively, in terms of the product CR. Further, these were found to have a long mean life time of not shorter than 300 hours, and none of these failed in the moisture-resistant load test. In addition, these were sintered at relatively low temperatures of not higher than 1300° C., and the crystal grains in the sintered samples were small and have grain sizes of not larger than 1 μm. Since the crystal grains existing in the dielectric ceramic layers in these samples are small, or that is, not larger than 1 μm, the number of the crystal grains in each dielectric ceramic layer is large. Accordingly, even if the ceramic laminate comprising these layers is thinned, the reliability of the capacitor comprising the laminate is not lowered.

Now, the reasons for defining the compositions for use in the present invention are mentioned below. First referred to are the reasons for defining α to fall within the range of $0.0025 \leq \alpha \leq 0.020$ in the composition of $(1-\alpha-\beta)\{BaO\}_m TiO_2 + \alpha Re_2O_3 + \beta(Mn_{1-x}Ni_x)O$, in which $Re_2O_3$ is at least one selected from $Tb_2O_3$, $Dy_2O_3$, $Ho_2O_3$, $Er_2O_3$ and $Yb_2O_3$. As seen in Sample No. 1, if the amount, α, of $Re_2O_3$ is smaller than 0.0025, the temperature-dependent variation in the capacitance is great, the insulation resistance at 125° C. is low, and the mean life time is very short.

On the other hand, as seen in Sample No. 18, if the amount, α, of $Re_2O_3$ is larger than 0.020, the dielectric constant is not larger than 3,000, the insulation resistance at 25° C. and 125° C. is low, the mean life time is short, some test pieces failed in the moisture-resistant load test, and the sintering temperature is high.

The reasons for defining β to fall within the range of $0.0025 \leq \beta \leq 0.04$ are as follows. Sample No. 2 shows that if the amount, β, of (Mn,Ni)O is smaller than 0.0025, the dielectric ceramics were reduced into semiconductors, when baked in the reducing atmosphere, to thereby lower the insulation resistance.

Sample No. 19 shows that if the amount, β, of (Mn,Ni)O is larger than 0.04, the insulation resistance at 25° C. and at 125° C. is lower than 6,000 MΩ·μF and 2,000 MΩ·μF, respectively, the mean life time is shorter than 300 hours, and the temperature-dependent variation in the capacitance is too large to satisfy the X7R-level characteristic standard of the EIA Standard.

The reasons for defining β/α to fall within the range of $\beta/\alpha \leq 4$ are as follows. As noted in Sample No. 21, if the ratio, β/α of the amount β of (Mn,Ni)O to the amount α of $Re_2O_3$ is larger than 4, the temperature-dependent variation in the capacitance is large, the insulation resistance at 125° C. is lower than 2000 MΩ·μF, and the mean life time is shorter than 300 hours.

The reasons for defining x to fall within the range of $0 \leq x < 1.0$ are as follows. As apparent in Sample No. 20, if the amount of NiO, x, is 1.0, the insulation resistance at 25° C. and at 125° C. is lower than 6,000 MΩ·μF and 2,000 MΩ·μF, respectively, and the mean life time is shorter than 300 hours.

The reasons for defining m to fall within the range of $1.000 < m \leq 1.035$ are as follows. As noted in Sample Nos. 3 and 4, if the molar ratio, m, of barium titanate is not larger than 1.000, the dielectric ceramic was converted into semiconductors when baked in the reducing atmosphere, whereby the insulation resistance of the capacitor was lowered (Sample No. 3); or the insulation resistance of the capacitor was lowered and the mean life time thereof was short so that the dielectric ceramic could not be used in preparing thin ceramic laminates (Sample No. 4).

On the other hand, as seen in Sample No. 22, if the molar ratio, m, is larger than 1.035, the sinterability of the sample is very poor.

The reasons for defining the magnesium oxide content to fall between 0.5 mols and 3.0 mols in terms of MgO are as follows. As seen in Sample No. 5, if the amount of MgO is smaller than 0.5 mols, the insulation resistance is low, and the temperature-dependent variation in the capacitance could not satisfy the X7R-level characteristic standard of the EIA standard although satisfying the B-level characteristic standard of the JIS Standard.

On the other hand, as noted in Sample No. 23, if the amount of MgO is larger than 3.0 mols, the sintering temperature shall be too high, the dielectric constant could not be over 3,000, and many test pieces of the sample failed in the moisture-resistant load test.

The reasons for defining the silicon oxide content to fall between 0.2 mols and 5.0 mols in terms of $SiO_2$ are as follows. As apparent in Sample No. 6, if the $SiO_2$ content is 0 (zero), the sample could not be sintered. As seen in Sample No. 7, if the $SiO_2$ content is smaller than 0.2 mols, the sintering temperature is too high, the insulation resistance is low, and many test pieces of the sample failed in the moisture-resistant load test.

On the other hand, as shown by Sample No. 24, if the $SiO_2$ content is larger than 5.0 mols, the dielectric constant could not be over 3000, and the insulation resistance at 125° C. could not be over 2,000 MΩ·μF.

The reasons for defining the alkali metal oxide impurity content of barium titanate to be not larger than 0.02% by weight are as follows. As noted in Sample No. 25, if the impurity, alkali metal oxide content of barium titanate is larger than 0.02% by weight, the dielectric constant is lowered.

In the above-mentioned Example, used was a powder of barium titanate prepared according to the oxalic acid method, which, however, is not limitative. Apart from this, also employable are powders of barium titanate prepared according to the alkoxide method or hydrothermal reaction method. If the latter powders are used, the characteristics of the capacitors may often be improved more than those of the samples as demonstrated in the Example herein.

Powders of terbium oxide, dysprosium oxide, holmium oxide, erbium oxide, ytterbium oxide, manganese oxide, nickel oxide and others were used in the Example, which, however, are not also limitative. Solutions of alkoxides or organic metal compounds for such oxides can also be employed, in place of such oxide powders, without interfering with the characteristics of the capacitors produced, provided that they are formulated to constitute the dielectric ceramic layers falling within the scope of the present invention.

In the monolithic ceramic capacitor of the present invention, the dielectric ceramic layers are made from a dielectric ceramic material that can be baked even in a reducing atmosphere without being reduced into semiconductors. Therefore, a base metal of nickel or a nickel alloy can be used as the material for the electrodes in the capacitor. In addition, since the dielectric ceramic material can be baked at relatively low temperatures of 1300° C. or lower, the production costs of the capacitor can be reduced.

Moreover, the monolithic ceramic capacitor of the invention that comprises ceramic layers made from such dielectric ceramic materials has a dielectric constant of 3000 or higher, and the temperature-dependent variation in the high dielectric constant of the capacitor is small. Further, the capacitor has high insulation resistance and has good characteristics, and their characteristics are not worsened even in high-temperature and high-humidity conditions.

In addition, since the crystals constituting the dielectric layers are small to have grain sizes of 1 μm or smaller, the layers can be thinned well, without reducing the number of the crystals therein, being different from the ceramic layers constituting conventional monolithic ceramic capacitors. Therefore, according to the present invention, it is possible to obtain high-reliability, small-sized, large-capacity, monolithic ceramic capacitors. While the invention has been described in detail and with reference to specific embodiments thereof, it will be apparent to one skilled in the art that various changes and modifications can be made therein without departing from the spirit and scope thereof.

What is claimed is:

1. A dielectric ceramic composition comprising:

a barium titanate containing a main component having the following compositional formula:

$$(1-\alpha-\beta)\{BaO\}_m TiO_2 + \alpha Re_2O_3 + \beta(Mn_{1-x}Ni_x)O$$

where $Re_2O_3$ is at least one member selected from the group consisting of $Tb_2O_3$, $Dy_2O_3$, $Ho_2O_3$, $Er_2O_3$ and $Yb_2O_3$, and α, β, m and x are $0.0025 \leq \alpha \leq 0.020$
$0.0025 \leq \beta \leq 0.04$
$\beta/\alpha \leq 4$
$0 \leq x \leq 1.0$
$1.000 < m \leq 1.035$;

manganese oxide;

nickel oxide;

magnesium oxide in an amount of from 0.5 to 3.0 mols in terms of MgO relative to 100 mols of the main component; and silicon oxide in an amount of from 0.2 to 5.0 mols in terms of $SiO_2$ relative to 100 mols of the main component.

2. The dielectric ceramic composition according to claim 1, wherein said barium titanate component has an alkali metal oxide impurity of 0.02% by weight or less.

3. The dielectric ceramic composition according to claim 2, wherein said alkali metal oxide impurity includes at least one oxide selected from the group consisting of SrO, CaO, $SiO_2$ and $Al_2O_3$.

4. The dielectric ceramic composition according to claim 3 wherein the amount of manganese oxide is about 1 to 2 mols and the amount of nickel oxide is about 1 to 2.5 mols.

5. The dielectric ceramic composition according to claim 4, wherein $0.0075 \leq \alpha \leq 0.012$
$0.0075 \leq \beta \leq 0.024$
$\beta/\alpha \leq 2$
$0.1 \leq x < 0.8$
$1.005 \leq m \leq 1.015$.

6. The dielectric ceramic composition according to claim 1 wherein the amount of manganese oxide is about 1 to 2 mols and the amount of nickel oxide is about 1 to 2.5 mols.

7. The dielectric ceramic composition according to claim 6, wherein $0.0075 \leq \alpha \leq 0.012$
$0.0075 \leq \beta \leq 0.024$
$\beta/\alpha \leq 2$
$0.1 \leq x < 0.8$
$1.005 \leq m \leq 1.015$.

8. A monotholic ceramic capacitor comprising;

at least three adjacent dielectric ceramic layers, at least two inner electrodes each of which is disposed between a pair of said adjacent dielectric layers and having an end exposed at the exterior of said layers and such that the end of at least one inner electrode is exposed at a different end of the dielectric ceramic layers than the exposed end of another inner electrode, and at least two outer electrodes electrically connected to the different ones of said exposed inner electrodes, wherein the dielectric ceramic layers are of the dielectric ceramic composition of claim 1.

9. The monolithic ceramic capacitor according to claim 8, wherein said barium titanate component has an alkali metal oxide impurity of 0.02% by weight or less.

10. The dielectric ceramic capacitor according to claim 9, wherein said alkali metal oxide includes at least one oxide selected from SrO, CaO, $SiO_2$ and $Al_2O_3$.

11. The monolithic ceramic capacitor according to claim 8, wherein at least one of said inner electrodes is made of at least one base metal.

12. The monolithic ceramic capacitor according to claim 11, wherein said inner electrodes include ceramic powder.

13. The monolithic ceramic capacitor according to claim 11, wherein said base metal is nickel or nickel alloy.

14. The monolithic ceramic capacitor as claimed in claim 13, wherein said barium titanate component has an alkali metal oxide impurity of 0.02% by weight or less, the amount of manganese oxide is about 1 to 2 mols, the amount of nickel oxide is about 1 to 2.5 mols, and $0.0075 \leq \alpha \leq 0.012$
$0.0075 \leq \beta \leq 0.024$
$\beta/\alpha \leq 2$
$0.1 \leq x < 0.8$
$1.005 \leq m \leq 1.015$.

15. The monolithic ceramic capacitor according to claim 14, wherein at least one of said outer electrodes is a sintered layer of an electroconductive metal powder.

16. The monolithic ceramic capacitor as claimed in claim 14, wherein the outer electrodes each comprising a first sintered layer of an electroconductive metal powder or of an electroconductive metal powder and glass frit, and a second plated layer on the first layer.

17. The monolithic ceramic capacitor according to claim 11, wherein at least one of said outer electrodes is a sintered layer of an electroconductive metal powder.

18. The monolithic ceramic capacitor according to claim 11, wherein at least one of said outer electrodes is the combination of an electroconductive metal powder and glass frit.

19. The monolithic ceramic capacitor as claimed in claim 11, wherein the outer electrodes each comprising a first sintered layer of an electroconductive metal powder or of an electroconductive metal powder and glass frit, and a second plated layer on the first layer.

* * * * *